United States Patent [19]
Murdoch et al.

[11] 3,765,495
[45] Oct. 16, 1973

[54] DRILL BIT SEALS

[75] Inventors: Henry W. Murdoch; Percy W. Schumacher, Jr., both of Houston, Tex.

[73] Assignee: G. W. Murphey Industries, Inc., Houston, Tex.

[22] Filed: Aug. 2, 1972

[21] Appl. No.: 277,351

[52] U.S. Cl..................... 175/371, 175/228, 308/8.2
[51] Int. Cl........................... E21b 9/08, F16j 15/16
[58] Field of Search.................... 175/371, 372, 228; 308/8.2, 36.1, 187.1, 187.2; 277/214

[56] References Cited
UNITED STATES PATENTS

| | | | |
|---|---|---|---|
| 3,047,344 | 7/1962 | Gros | 175/371 UX |
| 2,676,790 | 4/1954 | Turner | 308/8.2 X |
| 2,814,465 | 11/1957 | Green | 308/8.2 |
| 3,397,928 | 8/1968 | Galle | 308/36.1 X |
| 3,467,448 | 9/1969 | Galle | 175/372 X |
| 3,656,764 | 4/1972 | Robinson | 175/371 X |

*Primary Examiner*—David H. Brown
*Attorney*—C. M. Kucera

[57] ABSTRACT

An earth boring drill employing roller cutters is provided with a new and improved seal to inhibit ingress of detritus into the cutter bearing area and egress of lubricant therefrom. The parts may be so arranged that when assembled, the seal is placed in hoop compression. The shape of the seal is such that its cross section is not overly compressed or displaced when in operating position: this prevents undue compression set, wear and heating of the seal. Also, the seal has a greater radial cross-sectional extent that axial extent by a ratio of at least one-and-one-half to one to conserve bearing space and to provide the necessary flexibility to accommodate the various movements of the cutter relative to the shaft upon which it is rotatably mounted.

11 Claims, 3 Drawing Figures

DRILL BIT SEALS

BACKGROUND

The present invention relates to earth boring drill bits of the roller cutter type and more particularly to improvements in seal means therefor to confine a lubricant in the bearing area interiorly of the cutter and to keep formation cuttings and other detritus out of such bearing area.

During drilling operations, the seal encounters fluctuations in position and fluid pressure since the drill bit operates at various depths in a well in which drilling fluid is employed, and the cutter movement is complex relative to its bearing shaft in that it includes rapid axial and radial as well as wobbling motions, the magnitudes of which change as the parts are worn. Thus, a drill bit seal should operate under various conditions of operation and wear if it is to be effective to protect the bearings and enhance the useful drilling life of the bit. Also, it is desired that the seal take up as little axial space as practical so that adequate bearing capacity remains.

The seal of the invention is an elastomeric packing type seal which is shaped and arranged to be particularly useful as a rotary or dynamic seal for use in rock bit roller cutters.

Other shapes and arrangements of elastomeric packing type seals have been used in rock bit cutters in which, for example, the seal may be in the form of an "O" ring, or the seal might be approximately square in cross section. Packing type seals usually have solid cross sections and are single piece seals made of a single material, unlike lip seals or seals made of more than one material.

Seal manufacturers have recommended that for rotary applications, an "O" ring seal, for example, should be compressed in cross section less than 10 percent to prevent undue compression set, fatigue, wear and heating of the seal. For rock bit applications, the clearances and movements between the parts may be quite large so that the seal in order to be effective must be compressed sufficiently to be able to bridge such clearances between the cutter and its shaft as they occur. This may indicate that the seal should be compressed in cross section more than 10 percent because for an "O" ring having a cross-sectional diameter of 0.139 inches, a 10 percent squeeze would be only approximately 0.014 inches whereas the cutter movement toward and away from its shaft may be greater than 0.014 inches. But simply to compress the seal more than 10 percent may result in compression set and the other seal problems as previously stated.

It would seem that a solution would be to use an "O" ring having a large cross-sectional diameter such that the percent compression would be small while the total compression of the ring would be sufficient to take care of the expected cutter excursions; however, in rock bits the space available is very limited and to use such rings would result in less room for the bearings, so this would not be a practical solution.

It is an object of this invention to provide a seal which has a greater radial cross-sectional extent than axial extent by a ratio of at least one-and-one-half to one so that the total radial compression or displacement of the seal cross section can be sufficient to provide for the clearances and movements of the cutter with respect to its shaft taking into account additional clearances resulting from bearing wear. It is believed that in bits of say approximately nine inches in diameter, the seal cross section should be compressed at least 0.25 inches.

Since the seal cross section has a larger radial than axial extent, the compression thereof may be less than ten percent and still provide the desired excursion to effectively seal the cutter bearings without incurring undue compression set and the other attendant problems previously discussed.

Further, the seal shape leaves room for adequate cutter bearing capacity.

SUMMARY

In the practice of this invention, there is provided a seal, preferably rectangular in cross section, between a drill bit cutter and its bearing shaft, the parts being arranged and sized so that the seal under operating conditions is generally in hoop or circumferential compression rather than in hoop tension.

DRAWINGS

DESCRIPTION

Figure 1:
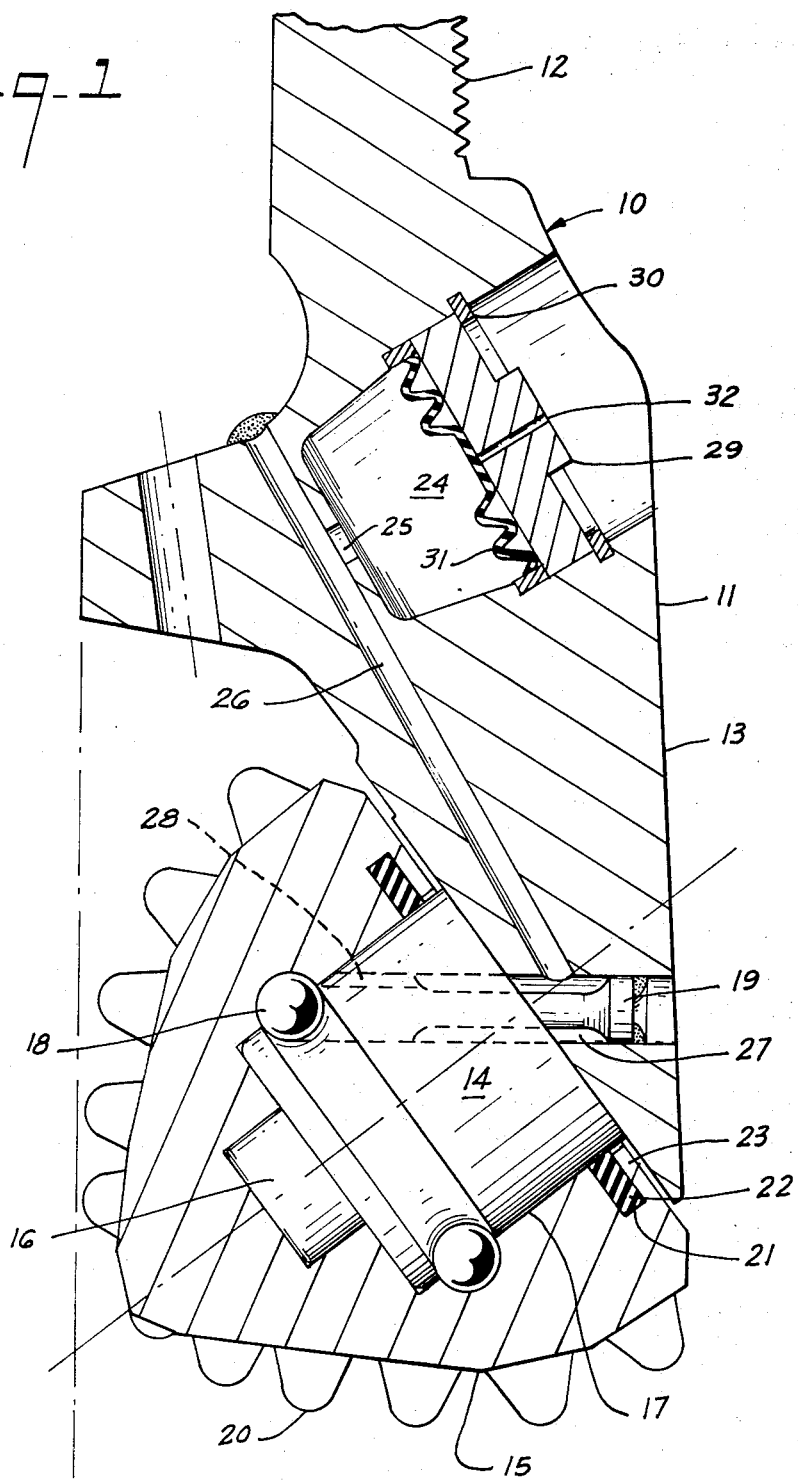
FIG. 1 is a longitudinal sectional view through a drill bit roller cutter together with its associated bearing shaft and support illustrating a seal arrangement constructed in accordance with this invention.
Figure 2:
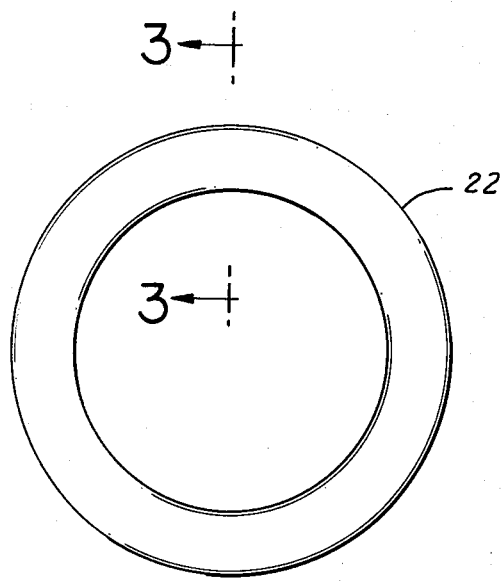
FIG. 2 is a partial side elevation view of the seal of the invention.
Figure 3:
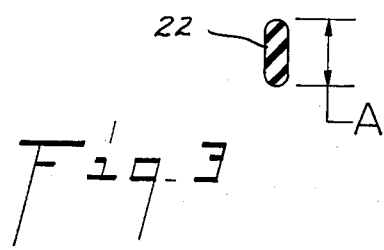
FIG. 3 is a sectional view taken along line 3—3 in FIG. 2.

Referring to the drawings, there is shown at 10 a cone cutter type of earth drill of generally conventional construction comprising a bit head 11 and a threaded shank 12 for connection to a drill stem (not shown). A cutter support 13 extends downwardly from the bit head and a bearing shaft 14 extends downwardly and inwardly from the support 13.

A roller cutter 15 is rotatably mounted on the bearing shaft 14 on friction bearings 16 and 17 and ball bearings 18. After the ball bearings have been inserted into place, a retaining pin 19 serves to keep them in place. The cutter 15, shaft 14, support 13 and attendant parts may be made of alloy steel and the cutter 15 may have tungsten carbide cutting inserts 20 therein, or other suitable cutting elements.

The cutter 15 has a groove 21 extending radially outwardly from the bearing shaft 14, and a seal ring 22, which may be made of Buna-N or the like and may be generally rectangular in cross section, is disposed in groove 21. A flange portion 23 helps to confine and protect the outboard side of seal ring 22 from being damaged by detritus or formation cuttings. The groove 21 serves to confine the seal 22 so that it does not tip or tilt axially to any great extent, moreover the groove finish may be relatively rough since it is preferred that the seal ring rotate with the cutter 15 and slide upon the bearing shaft 14.

A grease reservoir 24 in bit head 11 serves to provide lubricant to the cutter bearing through aperture 25 and passageway 26 in the bit head 11 and support 13 and channels 27 and 28 in the retaining pin 19. The reservoir 24 has a closure 29 secured in place with a snap ring 30. The closure 29 also serves to keep in place a flexible diaphragm 31 which seals the reservoir 24 from contaminants outside the drill bit. The closure 29 has a passageway 32 in communication with the outside of the diaphragm 31 and the exterior of the drill bit so that the pressure on the lubricant system is generally in balance.

Preferably the inside diameter of the seal 22 in its relaxed condition before being installed into cutter groove 21 is larger than the outside diameter of that portion of the shaft 14 which is operatively associated with the seal.

Also, the outside diameter of the seal 22 in its relaxed condition before being installed is larger than the maximum diameter of the cutter groove 21.

Further, the inside diameter of the seal 22 after it has been installed into cutter groove 21 is smaller than that portion of the shaft 14 which is operatively associated with the seal.

For example, the maximum diameter of groove 21 may be 2.805 inches. The outside diameter of the seal 22 may be 2.906 inches and the inside diameter of the seal may be 2.109 inches so that dimension A of the seal 22 is 0.398 inches. The diameter of the shaft 14 operating with the seal may be 2.065 inches. This provides a diametral clearance between the seal and the shaft which is at least 1 percent of the inside diameter of the seal 22.

Thus, the seal 22 when installed in operating position is in radial and circumferential or hoop compression. The inside diameter portion of the seal is also in hoop compression even though it must be pressed on the shaft 14.

The difference between the shaft diameter 2.065 inches and the groove diameter 2.805 inches is 0.740 inches in diameter or 0.370 inches from the top of the shaft 14 to the bottom of the groove 21. The seal 22 has a radial extent of 0.398 inches (dimension A). Thus, the cross section of the seal when installed is displaced radially 0.028 inches or approximately seven percent.

Since the seal 22 slides on the shaft 14 when the cutter 15 is rotated, it is desirable that the seal portion in contact with the shaft have its fibers in compression. If this portion of an elastomeric seal is in tension, the seal tends to fail in fatigue forming cracks normal to the direction of seal sliding with resultant leaks and reduced drill bit (bearing) life. It is believed that such failure occurs because an elastomeric in tension contracts when heated and the friction of the rotating seal on the shaft causes heat. Also, if the seal is in tension where it contacts the shaft, it is believed that the seal tends to stick and slip on the shaft as it rotates thereon and such alternate static and sliding condition could subject the seal to alternate tensile and compressive stresses which may lead to fatigue failure of the seal.

As previously stated, the seal 22 of the present invention is in hoop or circumferential compression in operation and such seals have been successfully tested in the field.

While the seals tested have been made of Buna-N of approximately 70 durometer, it is apparent that other elastomeric materials may be used. Also, while the seal 22 has been shown as having a generally rectangular cross section with rounded ends, any suitable shape may be used.

The seal arrangement of the invention provides a drill bit seal which occupies little axial space so that more bearing capacity may be provided in the limited space available, and an improved seal which provides excellent fatigue characteristics.

The foregoing disclosure and description of the invention are illustrative and explanatory thereof, and various changes in the size, shape and materials, as well as in the details of the illustrated construction, may be made within the scope of the appended claims without departing from the spirit of the invention.

What is claimed is:

1. Seal means for use in an earth boring drill bit having a head, a bearing shaft arranged thereon and a cutter rotatably mounted on the bearing shaft, including:
   the cutter having a circumferential groove therein,
   an elastomeric seal ring in said groove,
   the seal ring, the groove and the bearing shaft area confronting the groove being sized so that upon assembly of the cutter on the shaft the seal ring is compressed less than 10% of its relaxed condition radial thickness,
   the seal ring having a radial cross-sectional extent at least one and one-half times its axial extent.

2. Seal means according to claim 1 wherein:
   the inside diameter of the sealing ring being larger than the diameter of the shaft when the seal ring is in its relaxed condition before being installed in the drill bit cutter.

3. Seal means according to claim 1 wherein:
   the elastomers at the inside diameter and at the outside diameter of the seal ring are in hoop compression.

4. Seal means according to claim 1 wherein:
   the seal ring is in hoop compression and radial compression.

5. Seal means according to claim 1 wherein:
   the elastomer at the inside diameter of the seal ring is in hoop compression.

6. Seal means according to claim 1 wherein:
   the seal ring rotates with said cutter.

7. Seal means for use in an earth boring drill bit having a head, a bearing shaft arranged thereon and a cutter rotatably mounted on the bearing shaft, including:
   the cutter having a circumferential groove therein,
   an elastomeric seal ring in said groove in sealing and sliding engagement with said shaft,
   the inside diameter of the sealing ring being larger than the diameter of the shaft when the seal ring is in its relaxed condition before being installed in the drill bit cutter.

8. Seal means according to claim 7 wherein:
   the inside diameter of the seal ring is smaller than the shaft diameter after the seal is installed in the cutter groove.

9. Seal means for use in an earth boring drill bit having a head, a bearing shaft arranged thereon and a cutter rotatably mounted on the bearing shaft including:
   the cutter having a circumferential groove therein,
   an elastomeric seal ring in said groove in sealing and sliding engagement with said shaft,
   the diametral clearance between the outside diameter of the shaft and the inside diameter of the seal ring in its relaxed condition before being installed in the cutter groove and on said shaft, is at least one percent of the inside diameter of the seal ring.

10. A drill bit comprising:
    at least one head,
    a bearing shaft arranged on said head, and
    a cutter rotatably mounted on said bearing shaft,
    said cutter having a circumferential groove therein, and an elastomeric seal ring in said groove in sealing and sliding engagement with said shaft,
the inside diameter of said sealing ring being larger than the diameter of said shaft when said seal ring is in its relaxed condition prior to being installed in said cutter.

11. A drill bit comprising:
at least one head,
bearing shaft arranged on said head, and
a cutter rotatably mounted on said bearing shaft,
said cutter having circumferential groove therein, and
an elastomeric seal ring in said groove in sealing and sliding engagement with said shaft,
said seal ring, said groove, and said bearing shaft area confronting said groove being sized so that upon assembly of said cutter on said shaft, said seal ring is compressed less than 10 percent of its relaxed condition radial thickness,
said seal ring having a radial cross-sectional extent at least one and one-half times its axial extent.

* * * * *

UNITED STATES PATENT OFFICE
CERTIFICATE OF CORRECTION

Patent No. 3,765,495                    Dated October 16, 1973

Inventor(s) Henry W. Murdoch et al.

It is certified that error appears in the above-identified patent and that said Letters Patent are hereby corrected as shown below:

On the title page, change the Assignee "G. W. Murphey Industries, Inc." to -- G. W. Murphy Industries, Inc. --.

Column 2, line 2, change "0.25" to -- 0.025 --.

Signed and sealed this 4th day of June 1974.

(SEAL)
Attest:

EDWARD M. FLETCHER, JR.       C. MARSHALL DANN
Attesting Officer      Commissioner of Patents